US008419073B2

(12) United States Patent
Harhoff et al.

(10) Patent No.: US 8,419,073 B2
(45) Date of Patent: Apr. 16, 2013

(54) FUEL DISTRIBUTOR ASSEMBLY

(75) Inventors: Burkhard Harhoff, Bielefeld (DE); Markus Schmidt, Telgte (DE); Ludwig Wiedenlübbert, Halle (DE); Michael Gieβel, Bielefeld (DE)

(73) Assignee: Poppe & Potthoff GmbH, Werther (DE)

( * ) Notice: Subject to any disclaimer, the term of this patent is extended or adjusted under 35 U.S.C. 154(b) by 229 days.

(21) Appl. No.: 12/919,915

(22) PCT Filed: Mar. 4, 2009

(86) PCT No.: PCT/EP2009/001531

§ 371 (c)(1), (2), (4) Date: Aug. 27, 2010

(87) PCT Pub. No.: WO2009/112191

PCT Pub. Date: Sep. 17, 2009

(65) Prior Publication Data

US 2011/0012342 A1 Jan. 20, 2011

(30) Foreign Application Priority Data

Mar. 11, 2008 (DE) ......................... 10 2008 013 575

(51) Int. Cl.
*F16L 13/02* (2006.01)

(52) U.S. Cl.
USPC ...................... 285/288.1; 285/129.1; 123/456

(58) Field of Classification Search ............... 285/129.1, 285/288.1, 288.3, 288.4; 29/888.01, 525.14; 123/456, 469, 184.21
See application file for complete search history.

(56) References Cited

U.S. PATENT DOCUMENTS

| | | | | |
|---|---|---|---|---|
| 6,470,856 | B1 * | 10/2002 | Boecking | 123/456 |
| 6,513,498 | B1 | 2/2003 | Frank | |
| 6,609,502 | B1 | 8/2003 | Frank | |
| 6,698,801 | B1 * | 3/2004 | Boecking | 285/288.1 |
| 7,318,418 | B2 | 1/2008 | Usui et al. | |
| 2006/0054139 | A1 | 3/2006 | Yamamoto et al. | |

FOREIGN PATENT DOCUMENTS

| | | | |
|---|---|---|---|
| DE | 19933254 | A1 | 1/2001 |
| DE | 19936535 | A1 | 2/2001 |
| DE | 10152261 | A1 | 4/2003 |
| DE | 10221653 | A1 | 12/2003 |
| DE | 102005043015 | A1 | 4/2006 |
| DE | 102005044276 | A1 | 3/2007 |
| EP | 0866221 | B1 | 10/2001 |
| EP | 1182670 | A1 | 2/2002 |

(Continued)

OTHER PUBLICATIONS

English translation of International Preliminary Examination Report for parent PCT/EP2009/001531.

(Continued)

*Primary Examiner* — Aaron Dunwoody
(74) *Attorney, Agent, or Firm* — J-Tek Law PLLC; Jeffrey D. Tekanic

(57) ABSTRACT

In a fuel distributor assembly having a manifold (10) and at least one connecting nipple (12), which is welded to the manifold, for connecting a branch pipe to a transverse bore (16) leading through the wall of the manifold (10), an outer side of the connecting nipple transitions into the outer side of the manifold via an annular groove (26) that at least partially surrounds the outer side of the connecting nipple and is formed into the outer side of the manifold.

20 Claims, 3 Drawing Sheets

FOREIGN PATENT DOCUMENTS

| | | | |
|---|---|---|---|
| WO | 02097260 | A2 | 12/2002 |
| WO | 03036075 | A1 | 5/2003 |
| WO | 03098030 | A1 | 11/2003 |

OTHER PUBLICATIONS

International Search Report of Parent PCT Application No. PCT/EP2009/001531.

Office Action from German Patent Office in priority DE application No. 10 2008 013 575.5 dated Oct. 28, 2008.

Office Action mailed Jul. 31, 2012 from Japanese Patent Office for counterpart JP application No. 2010-550069, including English translation of Reasons for Refusal.

* cited by examiner

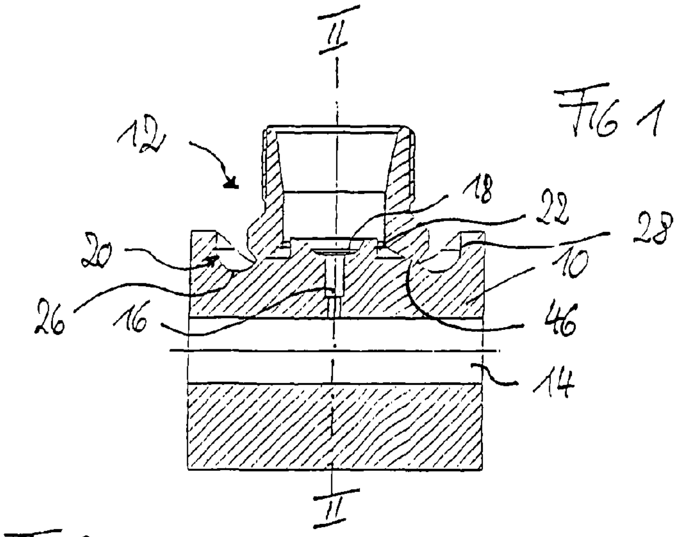
Fig 1
Fig 2
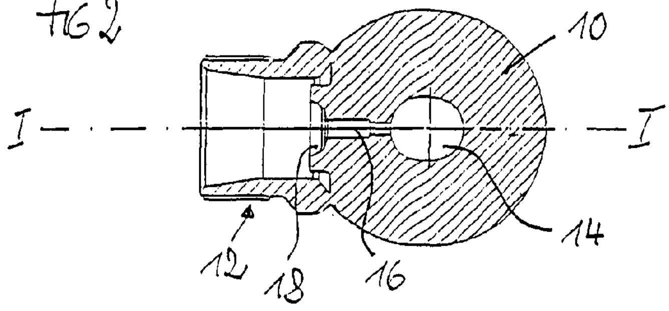
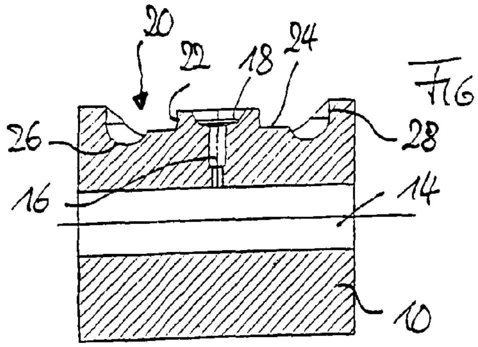
Fig 3
Fig 5
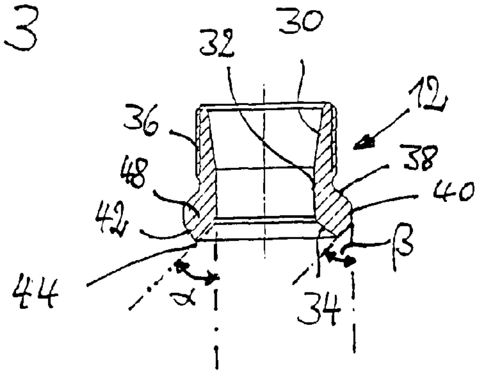
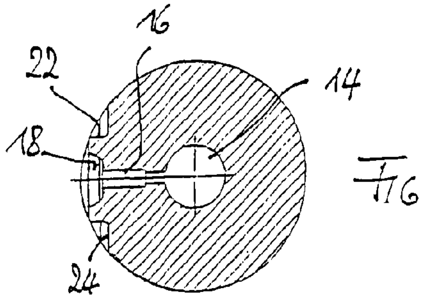
Fig 4

FUEL DISTRIBUTOR ASSEMBLY

CROSS-REFERENCE

This application is the U.S. national stage of International Application No. PCT/EP2009/001531 filed Mar. 4, 2009, which claims priority to German patent application no. 10 2008 013 575.5 filed Mar. 11, 2008.

TECHNICAL FIELD

Related Art

A related fuel distributor assembly is described, e.g., in EP 0 866 221 B1.

Such fuel distributor assemblies are utilized, e.g., in so-called common rail injection systems for diesel motors. In this case, the manifold is charged with highly-pressurized fuel from a high-pressure pump; the highly-pressurized fuel is fed through branch pipes of the individual injection nozzles, which branch pipes are connected to the manifold. Always-increasing demands on the quality of the exhaust gas necessitate an increasing of the injection pressure and thus an increasing of the resistance to pressure of such fuel distributor assemblies. In the meantime, pressures in the order of magnitude of 2500 bar are envisioned.

A fuel distributor assembly of the above-mentioned type is known from DE 10 2005 043 015 A1, whose connecting nipple has a wall, whose inner side and outer side narrow towards the end, which will be welded to the manifold, and ends in an annular projection. The annular projection is insertable into an annular groove that is formed on a flat outer circumferential surface of the manifold. By fitting the projection into the groove, the welding current can be concentrated onto the projection during electric resistance welding.

A fuel distributor assembly is known from DE 102 21 653 A1 that is also of the above-mentioned type, whose connecting nipple ends in a circular tip at its end that will be welded to an annular groove, which is formed in the outer surface of the manifold.

A reactor pressure vessel is known from EP 1 182 670 A1, in which a forged nozzle housing is integrated with a forged nozzle. The nozzle contains a bore that leads outwardly from an inner side of the nozzle housing. The nozzle housing comprises a reinforcement portion on its outer side; the nozzle is machined in the reinforcement portion such that an outer end of the nozzle does not extend beyond an outer surface of the reinforcement portion. A circumferential groove is machined into the reinforcement portion coaxial to the nozzle bore; the circumferential groove facilitates access to an outer end of the nozzle during welding.

A high-pressure fuel accumulator having a hollow base body and at least one transverse bore with a connection opening to the inner chamber of the base body is known from DE 101 52 261 A1. To increase the resistance to pressure, one or more notches and/or recesses for relieving the stress on the high pressure accumulator, which is being subjected to high pressure, are preferably formed on the outer surface and/or the inner surface of the hollow base body near the transverse bore.

SUMMARY

In one aspect of the present teachings, a fuel distributor assembly is provided that has an increased resistance to pressure as compared to known fuel distributor assemblies.

In another aspect of the present teachings, a fuel distributor assembly includes a manifold and at least one connecting nipple configured to connect a branch pipe to a transverse bore extending through the wall of the manifold. An outer side of the connecting nipple preferably transitions into the outer side of the manifold via a first annular groove that at least partially surrounds the outer side of the connecting nipple and is formed into the outer side of the manifold.

The annular groove, which is provided according to this aspect of the present teachings, leads to a substantial increase of the load-bearing capacity of the fuel distributor assembly.

In another aspect of the present teachings, the inner side of the connecting nipple transitions into a second, inner annular groove formed in the outer side of the manifold. The second annular groove surrounds the opening of the transverse bore formed in the outer side of the manifold with a spacing therebetween. In addition or in the alternative, the first annular groove has an approximately circular-segment-shaped cross-section in the longitudinal cross-section through the manifold. In addition or in the alternative, the connecting nipple is formed integrally with the manifold. In addition or in the alternative, a connection recess having an encircling inner wall, an encircling bottom wall and an outer wall present at least in the vertex portion of the outer side of the manifold is formed around the outer side of the opening of the transverse bore; a terminal-end surface of the connecting nipple facing towards the manifold is welded to the bottom wall such that the outer side of the connecting nipple transitions via the annular groove into the bottom wall or into the outer wall of the connection recess.

In another aspect of the present teachings, the first annular groove lengthens the outer wall of the connection recess towards the inner side of the manifold below the level of the bottom wall. In addition, the inner side of the first annular groove preferably ends, in the radial direction relative to the transverse bore, at the outer side of the welding of the connecting nipple to the bottom wall. In such an embodiment, the fuel distributor assembly advantageously can be manufactured from the manifold and the connecting nipple, which is initially manufactured separate therefrom.

In another aspect of the present teachings, the connecting nipple is spaced from the inner wall and from the outer wall of the connection recess. In addition or in the alternative, the terminal-end surface of the connecting nipple is welded to the bottom wall of the connection recess by capacitor discharge welding.

In another aspect of the present teachings, a manifold is provided for producing a fuel distributor assembly having at least one connecting nipple for connecting to a branch pipe, which connecting nipple is welded to the manifold. The fuel distributor assembly preferably comprises a transverse bore extending through the wall of the manifold and a connection recess disposed around the outside of an opening of the transverse bore. The connection recess preferably has an encircling inner wall, an encircling bottom wall and an outer wall present at least in the vertex portion of the outer side of the manifold. A terminal-end surface of the connecting nipple facing towards the manifold is preferably welded to the bottom wall of the connection recess. Further, the outer side of the connecting nipple transitions via a first annular groove into the bottom wall or into the outer wall of the connection recess. The manifold is optionally formed with the first annular groove before it is welded to the connecting nipple. The width of the annular groove, as measured in the extension direction of the bottom wall, is preferably approximately one-half of the distance between the inner wall and the outer wall of the connection recess. Further, the inner side of the first annular groove is preferably inclined towards the bottom wall at the transition to the bottom wall. The depth of the annular groove is preferably less than one-half of its width.

In another aspect of the present teachings, a connecting nipple is provided for producing a fuel distributor assembly having a manifold and at least one connecting nipple welded to the manifold for connecting to a branch pipe. The fuel distributor assembly preferably comprises a transverse bore extending through the wall of the manifold and a connection recess disposed around the outside of an opening of the transverse bore. The connection recess preferably has an encircling inner wall, an encircling bottom wall and an outer wall present at least in the vertex portion of the outer side of the manifold. A terminal-end surface of the connecting nipple facing towards the manifold is preferably welded to the bottom wall of the connection recess. Further, the outer side of the connecting nipple preferably transitions via a first annular groove into the bottom wall or into the outer wall of the connection recess. The first annular groove is optionally formed in the connection recess before it is welded to the connecting nipple. In addition, the width of the first annular groove, as measured in the extension direction of the bottom wall, is preferably approximately one-half of the distance between the inner wall and the outer wall of the connection recess. The inner side of the first annular groove may be inclined towards the bottom wall at the transition to the bottom wall. The radial outer side of the connecting nipple and the radial inner side of the connecting nipple may transition into an annular contact surface via respective conically-narrowing surfaces. The contact surface can be brought into abutment on the bottom wall. The connecting nipple optionally may be formed with an annular connecting bead projecting from its outer side on its end portion facing the contact surface.

Methods for producing a fuel distributor assembly are also disclosed.

For example, in a first method, a fuel distributor assembly is produced with a manifold and at least one connecting nipple for connecting a branch pipe to a transverse bore extending through the wall of the manifold. The method includes producing a one-piece assembly comprising the manifold and the connecting nipple and then forming a first annular groove into the outer side of the manifold at least partially surrounding the outer side of the connecting nipple such that the outer side of the connecting nipple transitions via the first annular groove into the outer side of the manifold.

In a second method, a fuel distributor assembly is produced with a manifold and at least one connecting nipple welded to the manifold for connecting to a branch pipe. The fuel distributor assembly preferably has a transverse bore extending through the wall of the manifold and a connection recess disposed around the outside of an opening of the transverse bore. The connection recess preferably has an encircling inner wall, an encircling bottom wall and an outer wall present at least in the vertex portion of the outer side of the manifold. The method includes shaping the connection recess such that its outer wall transitions via a first annular groove into the bottom wall. Then, the connecting nipple is inserted into the connection recess and a terminal-end surface of the connecting nipple facing towards the manifold is welded to a portion of the bottom wall of the connection recess that is located radially within the first annular groove.

In a third method, a fuel distributor assembly is produced with a manifold and at least one connecting nipple welded to the manifold for connecting to a branch pipe. The fuel distributor assembly preferably has a transverse bore extending through the wall of the manifold and a connection recess disposed around the outside of an opening of the transverse bore. The connection recess preferably has an encircling inner wall, an encircling bottom wall and an outer wall present at least in the vertex portion of the outer side of the manifold. The method includes inserting the connecting nipple into the connection recess, welding a terminal-end surface of the connecting nipple facing towards the manifold to the bottom wall of the connection recess and then shaping or forming a first annular groove that at least partially surrounds the connecting nipple. The radial inner portion of the annular groove borders on or emanates from a welding zone defined between the connecting nipple and the bottom wall.

Examples of the invention will be explained in further detail in the following with the assistance of schematic drawings.

BRIEF DESCRIPTION OF THE DRAWINGS

FIG. 1 depicts a longitudinal cross-section through a part of a manifold having a connecting nipple welded thereto, as viewed in plane I-I of FIG. 2, FIG. 2 depicts a cross-section through the assembly of FIG. 1, as viewed in plane II-II of FIG. 1, FIG. 3 depicts the view of the manifold of FIG. 1 without the connecting nipple welded thereto, FIG. 4 depicts the connector of the manifold of FIG. 2 without the connecting nipple welded thereto, FIG. 5 depicts a cross-section through a connecting nipple before it is welded to the manifold.

DETAILED DESCRIPTION OF THE INVENTION

Figure 6:
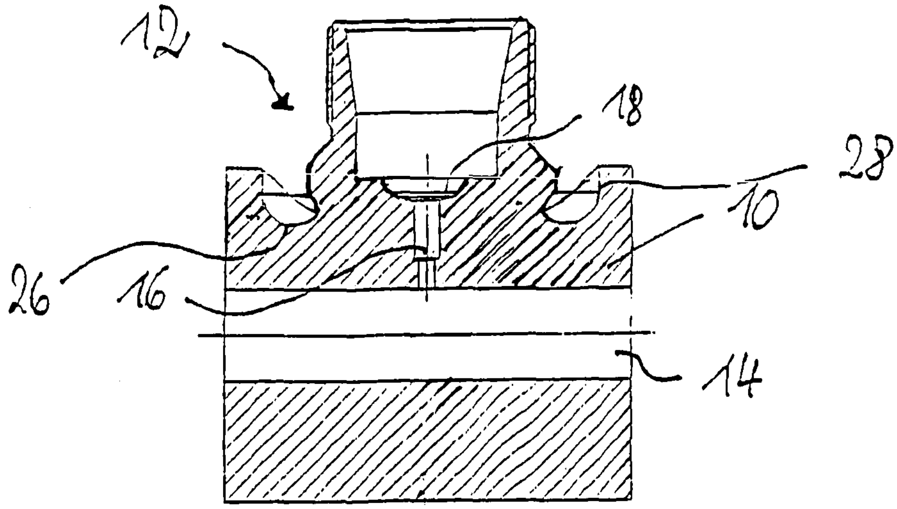
FIG. 6 depicts a view, similar to FIG. 1, of a modified embodiment.

FIG. 1 shows a cutaway of a manifold 10 that can be welded to a plurality of nipples 12 along its length. A not-illustrated branch pipe is connected to each nipple 12 in a known manner; an injection nozzle, in particular an injection nozzle provided on a diesel motor, is supplied with fuel at high pressure via the branch pipe. A longitudinal bore 14 extends through the manifold 10 along its length; individual transverse bores 16 extend from the bore 14 through the wall of the manifold 10, e.g., in the radial direction. Such a transverse bore 16 is depicted in FIG. 1, which, e.g., widens in a stepwise manner starting from the longitudinal bore 14 and ends in a concave opening 18.

A connection recess 20 is formed, preferably by a metal-cutting machining process, around the opening 18, preferably concentrically to the opening 18, on the outer side of the manifold 10, wherein a milling tool can be aligned to the transverse bore 16. The recess 20 has an inner side or inner wall 22 facing towards the opening 18, preferably directed parallel to the axis of the transverse bore 16; a bottom side or bottom wall 24, which is preferably directed perpendicular to the longitudinal bore 14, connects to the inner wall 22; the bottom wall 24 transitions via an annular groove 26 into an outer side or outer wall 28, which preferably again extends parallel to the axis of the transverse bore 16.

The connecting nipple 12 is welded to the portion of the bottom wall 24 of the connection recess 20 that faces towards the annular groove 26.

FIG. 3 shows the part of the manifold 10, which is depicted in FIG. 1, before it is welded to the connecting nipple 12. FIG. 4 shows the part of the manifold 10 that is depicted in FIG. 2.

According to FIGS. 3 and 4, the annular connection recess 20 is formed with a depth such that the inner wall 22 and at least the part of the bottom wall 24, to which the connecting nipple 12 is welded, extend completely around the transverse bore 16. The outer wall 28 and the annular groove 26, which connects the outer wall 28 with the bottom wall 24 in an undercut manner, are completely formed only in the vertex portion of the outer side of the manifold 10, that is, in the portions of the outer side that are adjacent to the opening 18 of the transverse bore 16 parallel to the axis of the manifold 10. Starting from these portions, the height of the outer wall 28 and then the depth of the annular groove 26 increasingly decrease until the annular groove 26 and the outer wall 28 are completely missing in the portions of the outer surface of the manifold 10 that are adjacent to the opening 18 transverse to the axis of the manifold 10, as depicted in FIG. 4. In this preferred embodiment of the connection recess 20, the wall of the manifold 10 is only minimally weakened and/or thinned.

As is further apparent from FIG. 3, the width of the annular groove 26, as measured at the level of the bottom wall 24, is for example approximately one-half as wide as the entire width of the connection recess 20 and/or the distance between the inner wall 22 and the outer wall 28. The annular groove 26 is preferably formed such that it continuously lengthens the outer wall 28 and transitions, in the cross-section, into the bottom wall 24 in a curved shape, e.g., in a circular arc shape, wherein the portion of the wall of the annular groove, which connects to the bottom wall 24, advantageously can be inclined relative to the axis of the transverse bore 16 and the annular groove can extend, in the cross-section, over a circumferential angle <180°. The cross-sectional shape of the annular groove is not required to be circular arc shaped; it can be elliptical, U-shaped or otherwise as appropriate.

FIG. 5 shows a cross-section through the connecting nipple 12 before it is welded to the manifold 10. Overall, the connecting nipple 12 is a cylindrical component having an inner wall, which includes a portion 30 that initially narrows from the top in a conical manner; the portion 30 transitions into a conically-widened portion 34 via a cylindrical portion 32 having an axis-parallel inner wall.

In the illustrated example according to FIG. 5, the upper portion of the outer side of the connecting nipple 12 preferably includes an outer thread 36 that transitions into a cylindrical portion 40 via a conically-widening portion 38; the cylindrical portion 40 transitions into an annular contact surface 44 via a narrowed portion 42; the contact surface 44 is preferably directed approximately perpendicular to the axis of the connecting nipple 12 and connects the portion 42 with the inner-side portion 34. The annular contact surface 44 can be formed as one or more narrow edges or as a stamped annular surface having a small width. The contact surface 44 is such that it comes into complete abutment on the bottom wall 24 when the connecting nipple 12 is inserted into the connection recess 20, preferably located approximately within the transition between the bottom wall 24 and the annular groove 26.

When the connecting nipple 12 is inserted into the connection recess 20, it is preferably welded to the manifold 10 using capacitor discharge welding, wherein the contact surface 44 broadens due to melting of the material and a welding zone results as denoted by 46 in FIG. 1; the terminal-end-side material of the connecting nipple 12 is welded in the welding zone 46 to the material of the manifold 10 in the area of the bottom wall 24.

As is further apparent from FIG. 1, the dimensioning of the connecting nipple 12 is advantageously such that the inner side of the connecting nipple 12 does not contact the inner wall 22 of the connection recess 20 and such that the radially-inner portion of the annular groove 26 is covered and/or is filled, at most only in a small amount, by material that melts during the welding.

With the described embodiment, a high-strength connection is achieved between the manifold 10 and the connecting nipple 12, which is formed at its end portion facing the manifold 10 as a kind of annular connecting bead 48 (FIG. 5) that conically narrows towards the manifold 10; the resistance to pressure of the connection is considerably increased in a surprising manner due to the annular groove 26 that preferably extends with a curved base.

When the connecting nipple 12 is welded to the manifold 10, a capacitor discharge welding method is not required to be utilized; instead, the welding can take place using laser welding or other known welding method. It is advantageous that the terminal end of the connecting nipple 12 is designed to match the bottom wall 24 such that the annular groove 26 is maintained and a stress concentration as small as possible emanates from the welding location, more precisely at the outer side of the connecting nipple. A small angle β (FIG. 5) is advantageous for this purpose.

In the preceding, an embodiment of the fuel distributor assembly was described, in which the annular groove 26 was formed in the connection recess 20 before the welding of the connecting nipple 12 to the bottom wall 24 of the connection recess 20. In the alternative, the annular groove 26 can be first formed, e.g., by milling, after the welding of the connecting nipple 12 to the outer side of the manifold 10 and/or to the bottom wall 24 of the connection recess 20. In this case, the connection recess 20 can initially be formed with a smaller radial extension in the direction away from the transverse bore 16 as compared to FIG. 3, so that the connecting nipple 12 is insertable into the connection recess 20. During the welding that joins the connecting nipple 12 with the manifold 10, the welding zone 46 forms, whose radial extension due to the flow of the material is generally larger than the radial extension of the contact surface 44 of the not-yet-welded connecting nipple 12. After the welding of the connecting nipple 12, the annular groove 26 is formed by moving a milling tool around the connecting nipple 12, e.g., moving the milling tool radially outside of the connecting nipple 12 with an axial feeding motion. In this case, in a correspondingly larger formation of the welding zone 46, a part of the material of the welding zone can be removed so that the undercut, which is visible in FIG. 1 in the transition from the connection recess 20 to the radial outer side of the connecting nipple 12, is not required to be present. The depth of the annular groove is advantageously deeper than the previously formed connection recess 20.

The distance visible in FIG. 1 between the inner side of the connecting nipple 12 and the inner wall 22 of the connection recess 20 is advantageously relatively small for a proper centering of the connecting nipple 12 in the connection recess 20. However, a contact in this area should not be present, so that it is ensured that the welding takes place only in the area of the bottom wall 24 of the connection recess 20.

FIG. 6 shows an embodiment, in which the manifold 10 and the connecting nipple 12 are produced by forging as a uniform-material assembly. In contrast to the embodiment according to FIG. 1, the annular hollow chamber between the inner side of the connecting nipple 12 and the inner wall 22 of the connection recess, which is clearly visible in FIG. 1, is missing due to the one-piece embodiment, because the connection recess is missing as a whole in the embodiment according to FIG. 6. After the forging, the outer side of the connecting nipple 12 directly transitions into the outer side and/or the upper surface of the manifold 10. The annular groove 26 is formed into the transition region, e.g., by milling, and has a cross-section similar to the cross-section illustrated in FIG. 1.

Figure 7:
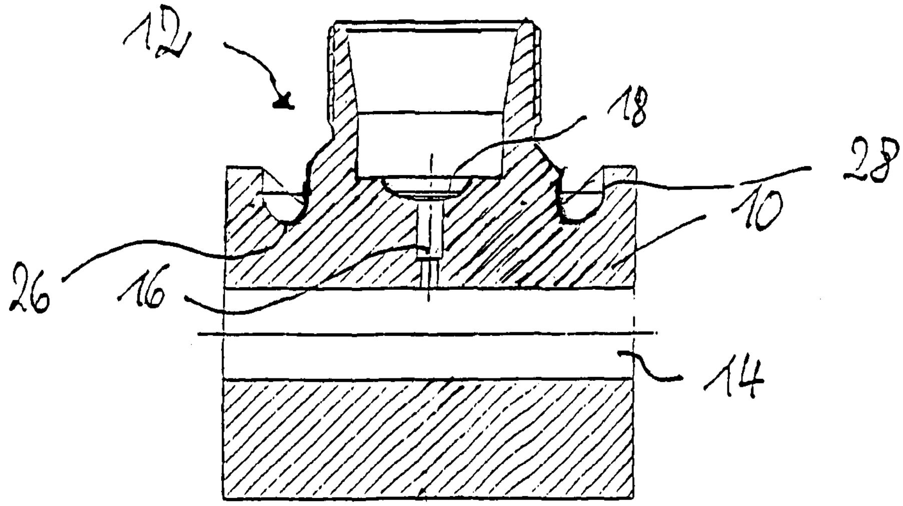
FIG. 7 depicts a view, similar to FIG. 6, of another embodiment.

The embodiment according to FIG. 7 differs from the embodiment according to FIG. 6 in that the radially-inner side of the annular groove 26 transitions into the outer side of the connecting nipple 12 without an undercut, wherein the inner side wall of the annular groove 26 extends approximately parallel to the axial direction of the connecting nipple and/or the transverse bore 16.

Figure 8:
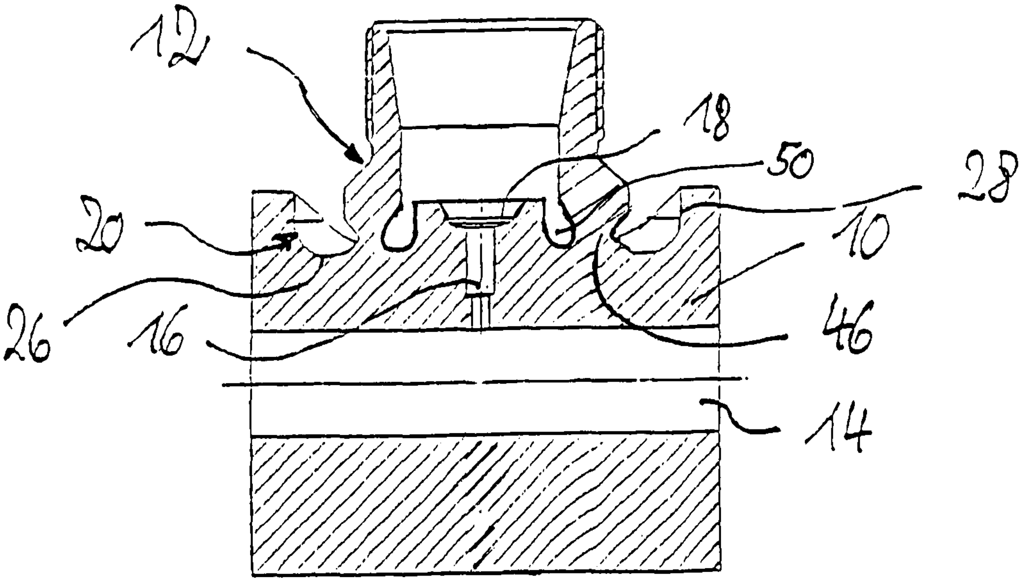
FIG. 8 depicts a view, similar to FIG. 1, of another embodiment.

FIG. 8 shows a view similar to FIG. 1 of a further embodiment of the inventive assembly. This embodiment has an annular groove 50 in addition to the annular groove 26; the inner side of the connecting nipple 12 transitions into the outer side of the manifold 10 via the annular groove 50. The inner annular groove 50 surrounds the opening 18 of the transverse bore 16 with a spacing therebetween, such that the opening 18 is sufficiently stable for a pressing-on of a terminal end of a branch pipe, which is attached to the connecting nipple 12, without deforming the wall of the radially-inner side of the inner annular groove 50.

Similar to how the annular groove 26 is formed into the connection recess 20, e.g., it can be milled, after which the connection recess 20 is formed into the manifold (compare FIG. 3), the inner annular groove 50 can also be introduced into this connection recess 20, so that the radially-inner side of the inner annular groove 50 lengthens the inner wall 22 of the connection recess 20 into the manifold 10. In the alternative, the inner annular groove 50 can be formed similar to the outer annular groove 26 after the connecting nipple 12 is welded to the connection recess 20. In addition, in the embodiment of the connecting nipple 12 that is integral with the manifold 10, the inner annular groove 50 can be additionally milled.

The inclination angles $\alpha$ and $\beta$ of the inner side and the outer side of the conically-narrowing portion 42, respectively, which are illustrated in FIG. 5, as well as the radial width of the contact surface 44, are selected such that a welding zone 46 forms, which reduces the formation of annular notches in the transition from an annular groove into the connecting nipple. When an annular groove is first milled after the connecting nipple 12 is welded to the manifold 10, the connecting nipple 12 can be milled, in a sufficiently wide welding zone 46, so far that the undercut in the transition from the annular connecting bead 58 (FIG. 5) of the connecting nipple to the manifold 10 is substantially or entirely eliminated.

A branch pipe (not illustrated) can be attached to the connecting nipple 12 in a known manner using a retainer nut that sealingly presses the branch pipe onto the conical portion 30 or the opening 18. For a connection with a branch pipe, the connecting nipple 12 can be designed in different ways and is not restricted to the embodiment with an outer thread.

Reference Number List

10 Manifold
12 Connecting nipple
14 Longitudinal bore
16 Transverse bore
18 Opening
20 Connection recess
22 Inner wall
24 Bottom wall
26 Annular groove
28 Outer wall
30 Portion
32 Cylindrical portion
34 Portion
36 Outer thread
38 Portion
40 Portion
42 Portion
44 Contact surface
46 Welding zone
48 Annular connecting bead
50 Inner annular groove

The invention claimed is:

1. A fuel distributor assembly comprising:
a manifold,
at least one connecting nipple configured to connect a branch pipe to a transverse bore extending through a wall of the manifold,
a connection recess formed in an outer surface of the manifold around an outer side of an opening of the transverse bore, the connection recess having an encircling inner wall, an encircling bottom wall and an outer wall present at least in a vertex portion of the outer surface of the manifold, and
a first groove formed in the bottom wall adjacent to the outer wall, the first groove at least partially surrounding an outer side of the connecting nipple,
wherein a terminal-end surface of the connecting nipple facing towards the manifold is welded to the bottom wall along a weld such that the outer side of the connecting nipple transitions via the first groove into the outer wall of the connection recess and
the first groove has a depth into the bottom wall that extends below a level of the weld between the connecting nipple and the manifold.

2. A fuel distributor assembly according to claim 1, wherein:
a second groove is defined in the outer surface of the manifold between the weld and the inner wall, and
the second groove is annular and completely surrounds the opening of the transverse bore with a spacing between the transverse bore and the second groove.

3. A fuel distributor assembly according to claim 1, wherein the first groove lengthens the outer wall of the connection recess towards an interior of the manifold below a deepest portion of the bottom wall and wherein an inner side of the first groove, in a radial direction relative to the transverse bore, ends at an outer side of the weld joining the connecting nipple to the bottom wall.

4. A fuel distributor assembly according to claim 1, wherein the connecting nipple is spaced from both the inner wall and the outer wall of the connection recess.

5. A fuel distributor assembly according to claim 1, wherein the first groove has a cross-section in a longitudinal direction of the manifold that is approximately circular-segment-shaped.

6. A manifold for producing the fuel distributor assembly according to claim 1, the manifold having the transverse bore extending through the wall of the manifold and the connection recess disposed around the outside of the opening of the transverse bore, the connection recess having the encircling inner wall, the encircling bottom wall and the outer wall present at least in the vertex portion of the outer surface of the manifold, wherein the first groove is formed in the bottom wall adjacent to the outer wall, has a depth into the bottom wall that extends below the level of the weld and has a width, as measured in a direction of extension of the bottom wall, that is approximately one-half of the distance between the inner and outer walls of the connection recess, and wherein an inner side of the first groove is inclined towards the bottom wall at a transition of the first groove to the bottom wall.

7. A manifold according to claim 6, wherein the depth of the first groove is less than one-half of its width.

8. A fuel distributor assembly according to claim 1, wherein:

in a direction parallel to a longitudinal direction of the manifold, the first groove extends into a portion of the bottom wall that is adjacent to the transverse bore, and at least one portion of the first groove extends inward in a direction perpendicular to the longitudinal direction of the manifold deeper than a deepest-most portion of the bottom wall.

9. A fuel distributor assembly according to claim 8, wherein:

the connecting nipple is spaced from, and does not directly contact, either the inner wall or the outer wall of the connection recess, and the inner side of the first groove ends, in the radial direction relative to the transverse bore, at an outer side of the weld that directly connects the connecting nipple to the bottom wall.

10. A fuel distributor assembly according to claim 1, wherein both a radial outer side of the connecting nipple and a radial inner side of the connecting nipple transition into the terminal-end surface, which defines an annular contact surface, via respective conically-narrowing surfaces, the annular contact surface flushly abutting the bottom wall.

11. A fuel distributor assembly according to claim 10, wherein the connecting nipple further comprises an annular connecting bead projecting from an outer side of the connecting nipple on an end portion facing the annular contact surface.

12. A fuel distributor assembly according to claim 11, wherein:

the inner wall and the outer wall extend parallel to a central axis of the transverse bore and the bottom wall extends perpendicular to both the inner wall and the outer wall.

13. A fuel distributor assembly according to claim 12, wherein the first groove is circular arc shaped, elliptical or U-shaped in a cross-section taken in a direction perpendicular to a circumferential direction of the first groove.

14. A fuel distributor assembly according to claim 1, wherein the terminal-end surface of the connecting nipple is also welded to a transition region of the first groove and the bottom wall.

15. A fuel distributor assembly according to claim 1, wherein:

the inner wall and the outer wall extend parallel to a central axis of the transverse bore and the bottom wall extends perpendicular to both the inner wall and the outer wall.

16. A fuel distributor assembly according to claim 1, wherein the first groove is circular arc shaped, elliptical or U-shaped in a cross-section taken in a direction perpendicular to a circumferential direction of the first groove.

17. A method for producing a fuel distributor assembly having a manifold and at least one connecting nipple that is welded to the manifold and is configured to connect to a branch pipe, the fuel distributor assembly having a transverse bore extending through a wall of the manifold and a connection recess defined around an outside of an opening of the transverse bore, the connection recess having an encircling inner wall, an encircling bottom wall and an outer wall present at least in a vertex portion of the outer side of the manifold, the method comprising:

shaping the connection recess such that its outer wall transitions via a first groove to the bottom wall, the first groove having a depth into the bottom wall that extends below the level of the weld, subsequently inserting the connecting nipple into the connection recess and welding a terminal-end surface of the connecting nipple facing towards the manifold to a portion of the bottom wall of the connection recess that is located radially within the first annular groove.

18. A method according to claim 17, wherein the welding step is performed by capacitor discharge welding.

19. A method for producing a fuel distributor assembly having a manifold and at least one connecting nipple that is welded to the manifold and is configured to connect to a branch pipe, the fuel distributor assembly having a transverse bore extending through a wall of the manifold and a connection recess defined around an outside of an opening of the transverse bore, the connection recess having an encircling inner wall, an encircling bottom wall and an outer wall present at least in a vertex portion of the outer side of the manifold, the method comprising:

inserting the connecting nipple into the connection recess, welding a terminal-end surface of the connecting nipple facing towards the manifold to the bottom wall of the connection recess and subsequently shaping a first groove so as to at least partially surround the connecting nipple, wherein a radial inner portion of the first groove borders on or emanates from a welding zone between the connecting nipple and the bottom wall and the first groove has a depth into the bottom wall that extends below the level of the welding zone.

20. A fuel distributor assembly comprising:

a manifold having a longitudinal bore extending along a longitudinal axis and at least one transverse bore extending through a wall of the manifold along a transverse axis perpendicular to the longitudinal axis, wherein a connection recess is defined in an outer surface of the manifold around an outer side of an opening of the transverse bore, the connection recess having a completely-encircling inner wall, a completely-encircling bottom wall adjacent to the inner wall, a first groove adjacent to the bottom wall and having a curved base in a cross-section along the longitudinal axis, and an outer wall adjacent to the first groove, the first groove and the outer wall being present at least in a vertex portion of the outer surface of the manifold, and a connecting nipple having a terminal-end surface facing towards the manifold that is welded to the bottom wall along a weld such that the outer side of the connecting nipple transitions via the first groove into the outer wall of the connection recess, the connecting nipple being configured to connect a branch pipe to the transverse bore, wherein:

the first groove at least partially surrounds the outer side of the connecting nipple, has a circular or circular arc shape in plan view, and has a depth that is deeper, in a direction towards an interior of the manifold, than both (i) the bottom wall and (ii) the weld joining the connecting nipple to the bottom wall.

* * * * *